No. 841,997. PATENTED JAN. 22, 1907.
E. E. MILLER.
CHEESE MILL.
APPLICATION FILED MAY 2, 1906.
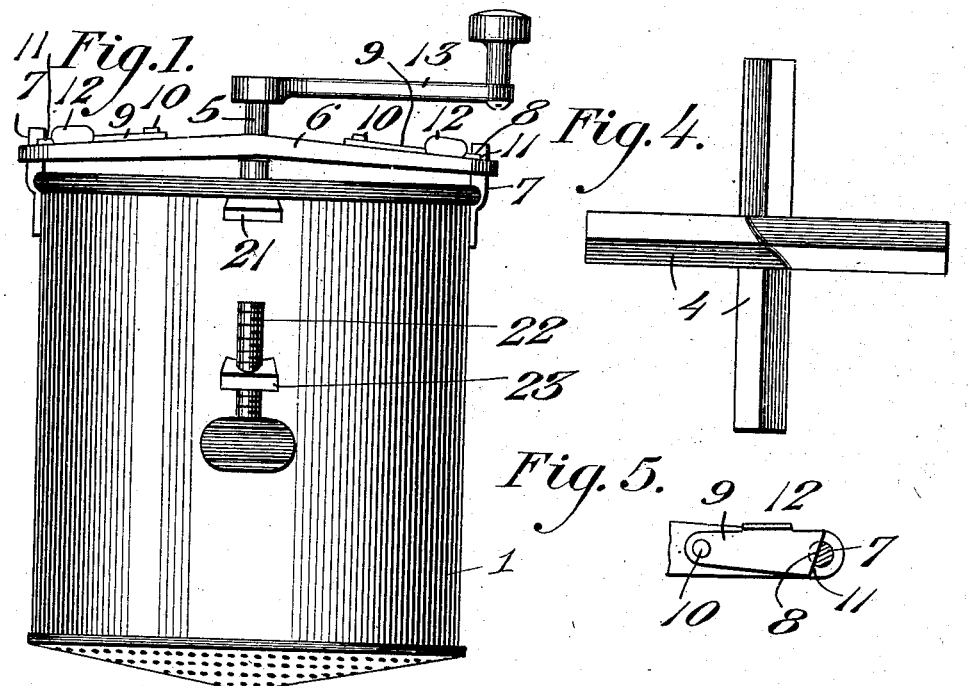
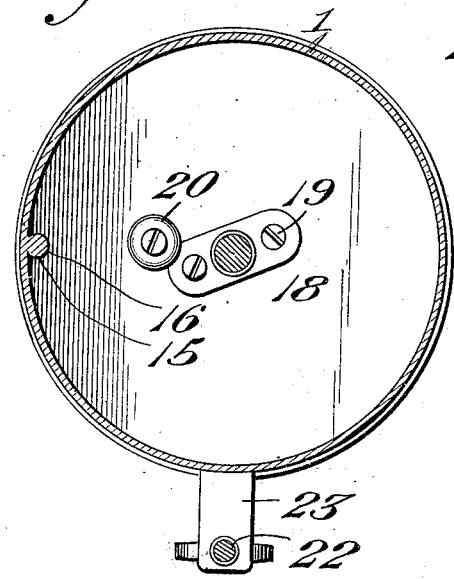
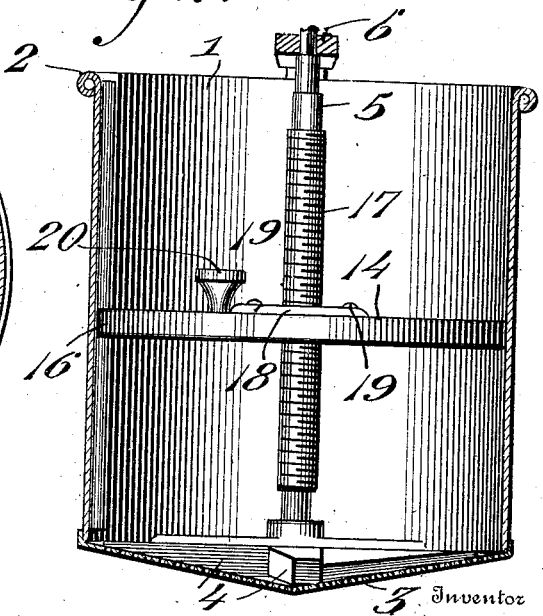
Witnesses
Phil E. Barnes
P. M. Smith
Inventor
Elmer E. Miller.
By Victor J. Evans,
Attorney

UNITED STATES PATENT OFFICE.

ELMER E. MILLER, OF SACRAMENTO, PENNSYLVANIA.

CHEESE-MILL.

No. 841,997.  Specification of Letters Patent.  Patented Jan. 22, 1907.

Application filed May 2, 1906. Serial No. 314,812.

*To all whom it may concern:*

Be it known that I, ELMER E. MILLER, a citizen of the United States, residing at Sacramento, in the county of Schuylkill and State of Pennsylvania, have invented new and useful Improvements in Cheese-Mills, of which the following is a specification.

This invention relates to cheese-mills, the object of the invention being to provide a simple, convenient, and practical mill for grinding and disintegrating cheese which will operate with great rapidity, thoroughly disintegrate the cheese, and avoid liability of any portion of the mill becoming clogged, the discharge-openings or sieve of the mill being kept clean and free from clogging material and the material being advanced with the necessary rapidity by means of a suitable presser-head or follower.

With the above and other objects in view the invention consists in the novel construction, combination, and arrangement of parts hereinafter more fully described, illustrated, and claimed.

In the accompanying drawings, Figure 1 is a side elevation of a cheese-mill embodying the present invention. Fig. 2 is a vertical diametrical section through the same. Fig. 3 is a horizontal plan view thereof. Fig. 4 is a plan view of the grinding-head. Fig. 5 is a detail plan view showing one of the latches.

The cheese-mill contemplated in this invention comprises, essentially, a cylindrical body 1, which may be formed of sheet metal, having the upper edge thereof bent over to form a reinforcing bead or rim 2, while connected to the lower edge of the body 1 is a conical perforated bottom or sieve 3, the vertex of which is disposed downwardly, so that the cheese will have a tendency to gravitate toward the center of the bottom as it is acted upon by the grinding-head hereinafter described.

Operating over and in contact with the sieve 3 is a grinding-head composed of intersecting diametrically-disposed grinding-bars 4, each of which is substantially square or diamond-shaped in cross-section, as indicated in Fig. 4. The arms 4 are also inclined on their lower edges to agree with the inclination or pitch of the perforated bottom or sieve 3, as shown in Fig. 2, the said arms operating in close rubbing and grinding contact with the sieve, so as to thoroughly break up, pulverize, and disintegrate the cheese as it is forced through the perforations or interstices of the sieve.

The grinding-head is rotated by means of a revolving shaft 5, the grinding-head being fast on the lower end of said shaft, while the upper end portion thereof is journaled in a cross-bar 6, extending diametrically across the top of the cylindrical body 1 and provided at its extremities with openings which receive upstanding posts or keepers 7 on the body 1, as shown in Fig. 1. The posts 7 are notched, as shown at 8, and in connection therewith a pair of latches 9 are employed, the same being pivotally mounted at 10 on the cross-bar 6 and having their extremities beveled, as shown at 11, so as to enter and engage the notches 8 of the posts 7 for locking the cross-bar 6 to said posts and fastening said cross-bar to the cylindrical body 1 of the mill. Each of the latches is preferably provided with a thumb-piece 12 to facilitate manipulating the same. The shaft 5 is provided with an operating crank-handle 13 by means of which rotary motion may be imparted to the grinding-head. Working up and down within the cylindrical body 1 is a presser-head or follower 14, which at the one side is notched, as shown at 15, to embrace a guide 16, extending from top to bottom of the body 1 and fastened to one side thereof, as shown in Figs. 2 and 3. The rotating shaft 5 is provided with a threaded portion 17, which passes through the follower 14 and engages a nut or internally-threaded plate 18, which is secured to the follower 14 by suitable fasteners 19. Thus in the rotation of the shaft 5 and the grinding-head carried thereby the follower 14 is fed downward, so as to force the material in advance thereof downward against the sieve at the bottom of the body 1, subjecting said material to the grinding action of the grinding-head, which operates to disintegrate the cheese and force the same rapidly through the bottom sieve. The follower 14 is shown as provided with a knob or handle 20, by means of which it may be steadied and placed in position and removed therefrom when it becomes necessary to cleanse the parts of the mill.

In order to support the mill on a table or like device, a table-clamp is provided, the same embodying a stationary jaw 21, projecting from one side of the body 1, and the clamping-screw 22, working through an internally-threaded lug 23, projecting from the side of the body 1, as clearly shown in Fig. 1, the lug 21 being adapted to rest on the top of the table, while the clamping-screw 22 bears against the under side of the table-top and securely holds the mill in position.

From the foregoing description it will be seen that the cheese is forced downward with the necessary pressure and rapidity against the conical sieve or perforate bottom of the body of the mill and that said cheese is simultaneously acted upon by the grinding-head, which pulverizes or disintegrates the cheese and forces the same through the perforations or meshes of the sieve.

I claim—

1. A cheese-mill comprising a cylindrical body provided with a conical sieve-bottom, a rotary shaft extending into said body portion, a grinding-head fast on said rotary shaft, said grinding-head consisting of crossed arms which conform in contour to the form of the sieve, a presser-head or follower provided with means for preventing its rotation and movable up and down within the body and having a threaded engagement with said shaft through the medium of a threaded plate secured to said presser-head, a cross-bar in which the shaft is journaled, said cross-bar provided with holes in the opposite ends thereof, posts extending upward from the opposite edges of the body and pivoted latches mounted on said cross-bar and adapted to be moved into and out of engagement with said posts for locking the cross-bar to the body of the mill.

2. A cheese-mill comprising a cylindrical body portion provided with a conical sieve-bottom, a rotary shaft working in said body, said shaft being threaded, a grinding-head fast on said rotary shaft and conforming in contour to said sieve-bottom, a presser-head or follower movable up and down within the body and having a threaded engagement with said shaft, said presser-head having a notch at one side and a guide secured to the inner wall of the body to engage said notch to guide the presser-head, substantially as described.

In testimony whereof I affix my signature in presence of two witnesses.

ELMER E. MILLER.

Witnesses:
   C. G. UPDEGRAVE,
   GEO. REED.